(12) United States Patent
Battestilli et al.

(10) Patent No.: US 8,488,456 B2
(45) Date of Patent: Jul. 16, 2013

(54) LOAD-BALANCING VIA MODULUS DISTRIBUTION AND TCP FLOW REDIRECTION DUE TO SERVER OVERLOAD

(75) Inventors: Tzvetelina B. Battestilli, Raleigh, NC (US); Steven W. Hunter, Raleigh, NC (US); Terry L. Nelms, Dallas, GA (US); Gary R. Shippy, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/468,482

(22) Filed: May 10, 2012

(65) Prior Publication Data

US 2012/0224486 A1  Sep. 6, 2012

Related U.S. Application Data

(63) Continuation of application No. 12/767,256, filed on Apr. 26, 2010, now Pat. No. 8,243,598.

(51) Int. Cl.
*G01R 31/08* (2006.01)

(52) U.S. Cl.
USPC ........... 370/230; 370/235; 370/401; 709/224; 709/226; 709/235; 709/239

(58) Field of Classification Search
USPC ............... 370/230, 230.1, 232, 401; 709/224, 709/226, 235, 238, 239
See application file for complete search history.

(56) References Cited

U.S. PATENT DOCUMENTS

| | | | |
|---|---|---|---|
| 6,856,991 B1 | 2/2005 | Srivastava | |
| 6,888,797 B1 | 5/2005 | Cao et al. | |
| 6,944,678 B2 | 9/2005 | Lu et al. | |
| 6,985,956 B2 | 1/2006 | Luke et al. | |
| 7,062,571 B1 | 6/2006 | Dale et al. | |
| 7,117,269 B2 | 10/2006 | Lu et al. | |
| 7,328,237 B1 * | 2/2008 | Thubert et al. | 709/203 |
| 7,480,309 B1 | 1/2009 | DeJager et al. | |
| 7,512,702 B1 | 3/2009 | Srivastava et al. | |
| 7,581,009 B1 | 8/2009 | Hsu et al. | |

(Continued)

OTHER PUBLICATIONS

Z. Cao et al., "Performance of Hashing-Based Schemes for Internet Load Balancing", Infocom 2000, Nineteenth Annual Joint Conference of the IEEE Computer and Communications Societies, 2000, vol. 1, pp. 332-341.

(Continued)

*Primary Examiner* — Jung Park
(74) *Attorney, Agent, or Firm* — Cynthia G. Seal; Law Office of Jim Boice

(57) ABSTRACT

A method, switch, and/or computer program product routes IP packet flows. An Ethernet switch receives an IP packet flow. Each of the packets in the IP packet flow has a header that contains a same 5-tuple. A load balancing control engine determines whether servers in a group of servers are balanced in their utilization according to 5-tuple redirection rules contained in the load balancing control engine. In response to the load balancing control engine determining, according to the 5-tuple redirection rules, that the servers are balanced, the Ethernet switch routes the IP packet flow to the servers. In response to the load balancing control engine determining that the servers are unbalanced, the load balancing control engine instructs the Ethernet switch to redirect the IP packet flow to a server that is relatively less busy than other servers.

17 Claims, 7 Drawing Sheets

U.S. PATENT DOCUMENTS

| | | |
|---|---|---|
| 8,078,755 B1 | 12/2011 | Liu et al. |
| 2005/0055435 A1* | 3/2005 | Gbadegesin et al. ......... 709/224 |
| 2005/0080923 A1 | 4/2005 | Elzur |
| 2006/0155862 A1 | 7/2006 | Kathi et al. |
| 2008/0028456 A1 | 1/2008 | O'Rourke et al. |
| 2008/0114892 A1 | 5/2008 | Bruno et al. |
| 2009/0262741 A1 | 10/2009 | Jungck et al. |
| 2010/0036903 A1* | 2/2010 | Ahmad et al. ................ 709/202 |
| 2011/0116443 A1* | 5/2011 | Yu et al. ........................ 370/328 |

OTHER PUBLICATIONS

U.S. Appl. No. 12/767,256—Specification Filed April 26, 2010.
U.S. Appl. No. 12/767,256—Non-Final Office Action Mailed February 9, 2012.

* cited by examiner

LOAD-BALANCING VIA MODULUS DISTRIBUTION AND TCP FLOW REDIRECTION DUE TO SERVER OVERLOAD

The present application is a continuation of U.S. patent application Ser. No. 12/767,256, filed on Apr. 26, 2010, and titled "Load-Balancing Via Modulus Distribution and TCP Flow Redirection Due to Server Overload," which is incorporated herein by reference.

BACKGROUND

The present disclosure relates to the field of computers, and specifically to IP packet flows communicated among computers. Still more particularly, the present disclosure relates to dynamically load balancing the direction of IP packet flows.

SUMMARY

A method, switch, and/or computer program product routes IP packet flows. An Ethernet switch receives an IP packet flow. Each of the packets in the IP packet flow has a header that contains a same 5-tuple. A load balancing control engine determines whether servers in a group of servers are balanced in their utilization according to 5-tuple redirection rules contained in the load balancing control engine. In response to the load balancing control engine determining, according to the 5-tuple redirection rules, that the servers are balanced, the Ethernet switch routes the IP packet flow to the servers. In response to the load balancing control engine determining that the servers are unbalanced, the load balancing control engine instructs the Ethernet switch to redirect the IP packet flow to a server that is relatively less busy than other servers.

DETAILED DESCRIPTION

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
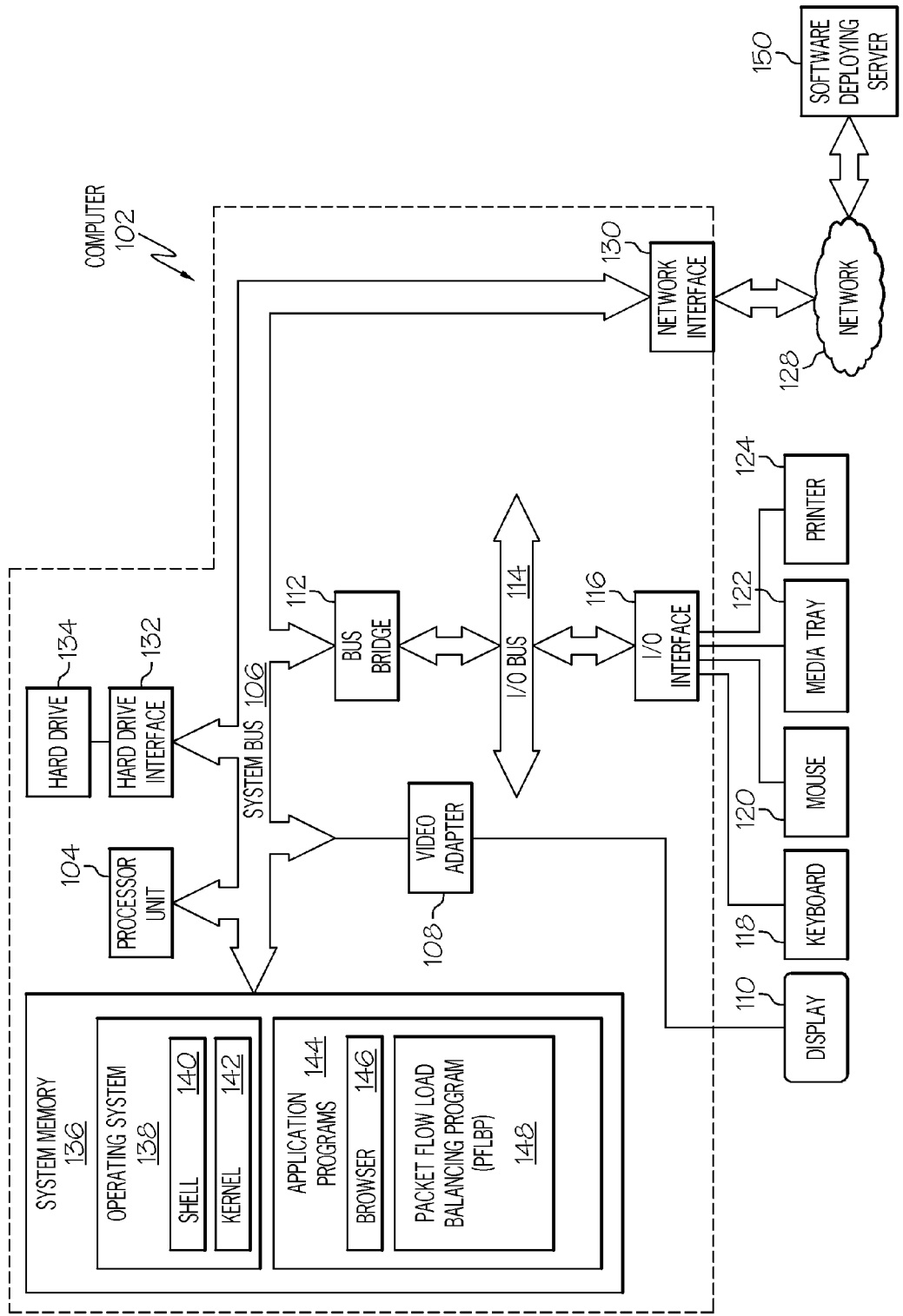
FIG. 1 depicts an exemplary computer that may be used in implementing the present disclosure.

With reference now to the figures, and in particular to FIG. 1, there is depicted a block diagram of an exemplary computer 102, which may be utilized by the present disclosure. Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and a printer 124. While the format of the ports connected to I/O interface 116 may be any known to those skilled in the art of computer architecture, in a preferred embodiment some or all of these ports are universal serial bus (USB) ports.

As depicted, in one embodiment, computer 102 is optionally able to communicate via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 also include an IP packet flow load balancing program (PFLBP) 148, which, when executed, performs some or all of the processes described in FIGS. 2-6. In one embodiment, PFLBP 148 is downloadable from software deploying server 150 in an on-demand basis, such that units of code are downloaded only when needed. In another embodiment, some or all of the processes executed by PFLBP 148 are performed by software deploying server 150 itself, thus minimizing the use of resources within computer 102.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
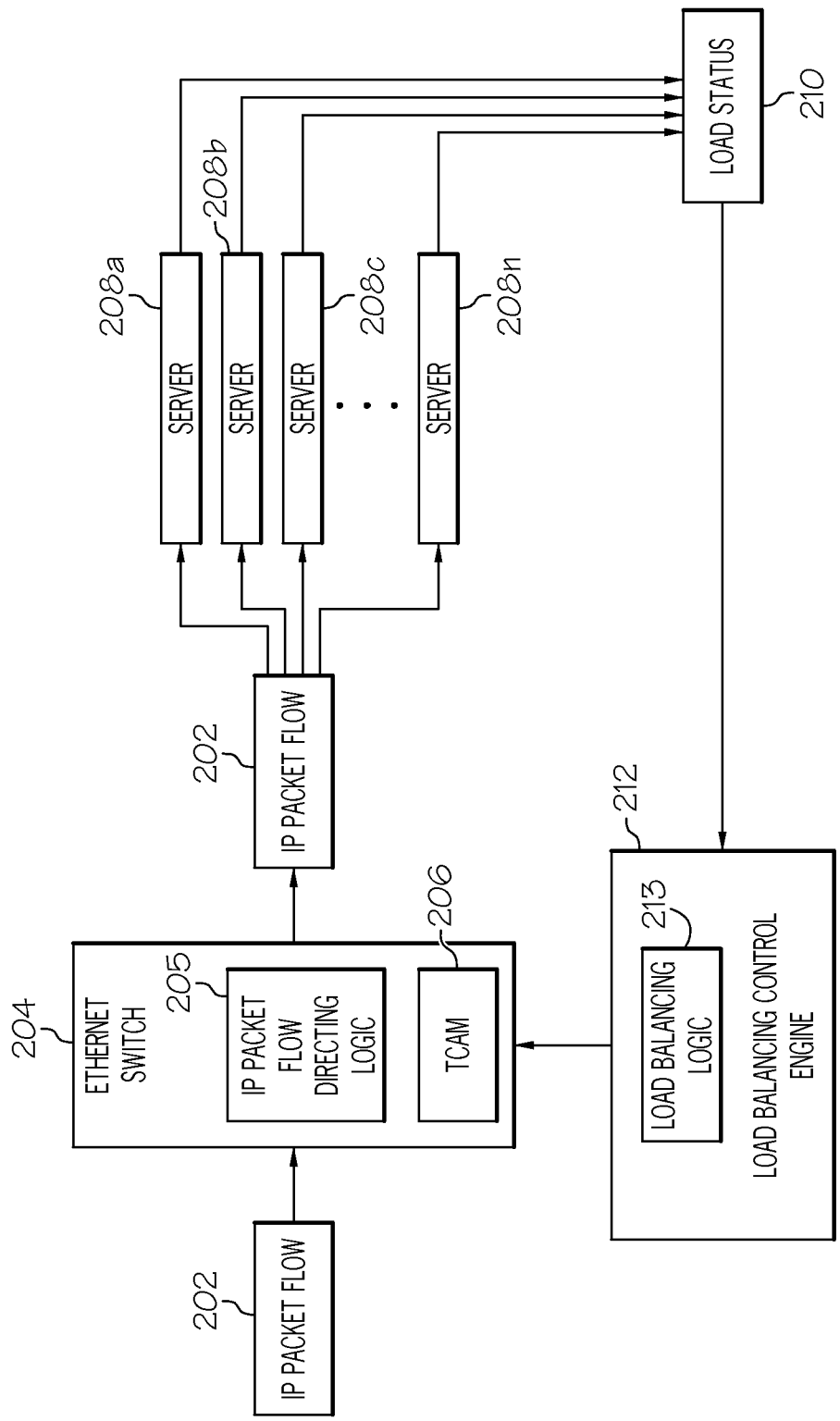
FIG. 2 illustrates a IP packet flow being directed to different servers in accordance with one embodiment of the present disclosure.

With reference now to FIG. 2, an exemplary load balancing of an IP packet flow 202, in accordance with one embodiment of the present disclosure, is presented. IP packet flow 202 is a series of related packets (not shown) that share a common property. One important such property is the flow's endpoints. In one embodiment, a flow is defined as all packets that have a header that contains the same 5-tuple (not shown). The 5-tuple includes a source internet protocol (IP) address, a source port number, a destination IP address, a destination port number, and a protocol number that describes what protocol (i.e., transmission control protocol—TCP, user datagram protocol—UDP, etc.) is being used to direct and control the packet. The 5-tuple in the packet header indicates that series of packets are part of the same IP packet flow 202. For example, the header of a first packet in IP packet flow 202 may include a set "SYN" field, indicating that it is initiating a new TCP connection, and any following packets with the same 5-tuple are part of the same TCP connection and IP packet flow.

In the most basic operation, an Ethernet switch 204 will parse the destination MAC address from an Ethernet frame and then check in a lookup table in a local memory, such as a ternary content addressable memory (TCAM) 206, in order to determine which one of its ports to route the frame through the use of an IP packet flow directing logic 205. Note that IP packet flow directing logic 205 may be implemented in hardware or software. As described below, in one embodiment the IP packet flow 202 is to be sent to a specific sequence of servers, wherein each server in the specific sequence of servers comes from a different server group from the multiple server groups. Thus, packets from the IP packet flow 202 are routed to the specific sequence of servers using redirecting logic (not shown) within the IP packet flow directing logic 205 for redirecting these packets accordingly.

If an Ethernet switch 204 is used for load-distribution between a plurality of servers, then the switch will parse an m-tuple (where m is an integer equal to or less than the number of different fields in the header) from the packet's IP header and compare it with its TCAM rules. In switch terminology, the ports of the Ethernet switch 204 that are directly attached to the servers 208a-n (where "n" is an integer) are grouped in a Link Aggregation Group (LAG). If the TCAM rules specify that the packet is to be sent to a LAG, then Ethernet switch 204 uses its built-in load-distribution function to determine which exact port to route the packet. Each packet from IP packet flow 202 is thus directed to an appropriate server selected from servers 208a-n using the IP packet flow directing logic 205. The "appropriate server" is the server selected by the load-distribution function of Ethernet switch 204. In one embodiment, this static load-distribution function may utilize a hashing function, a cyclic redundancy check (CRC) and modulus on the number of servers 208a-n.

Note that there is no direct load status feedback from the servers 208a-n to Ethernet switch 204. Ethernet switch 204 uses its built-in load-distribution function to determine what port to route packets to. If Ethernet switch 204 was to received feedback and load-balance to the servers by keeping redirection rules for each flow in TCAM 206, this would require an inefficiently large TCAM 206 and impede performance. Thus, in accordance with the novel present disclosure, the servers 208a-n send a load status 210 to a load balancing control engine 212, preferably in a continuous manner and in real time. This load status 210 describes in real time what quantity of resources (i.e., processing power, busses, network connectors, etc.) are being used (or remain available) on each of the servers 208a-n. The load balancing control engine 212 processes the load status 210 to determine if any of the servers 208a-n are being overutilized. If so, then the load balancing control engine 212 tells Ethernet switch 204 which of the servers 208a-n are overutilized and Ethernet switch 204 marks the status of the ports to these overutilized servers as "busy". Next, if Ethernet switch 204 receives a new flow which is to be sent to one of these "busy" ports (based on its load-distribution function) it instead sends it to the load-balancing control engine 212 for a load-balancing decision. The load-balancing control engine 212 uses the load status 210 information to pick a new server for this flow. Then the load-balancing control engine 212 informs Ethernet switch 204 (by inserting a specific rule based on the 5-tuple in Ethernet switch 204's TCAM) to re-direct the next packets of this flow (not shown) to this newly picked server. When the next packets of this flow arrive at Ethernet switch 204, the re-direction rule in TCAM 206 is used to re-direct them to the server. Note that such specific TCAM rules based on the 5-tuple are not maintained during normal switch operations, in which the IP packet flow 202 is sent to the server to which it is addressed based on the load-distribution function of Ethernet switch 204. Thus, the size of the TCAM 206 remains small, since it is only used to store dynamically redirected IP packet flow state, rather than the state of all flows. Note also that the load balancing control engine 212 utilizes a load balancing logic 213 for redirecting the IP packet flow 202. Load balancing logic 213 is software and/or hardware logic, and may be part of PFLBP 148 described above in FIG. 1. Note that load balancing logic 213 is logically isolated from the Ethernet switch 204. More specifically, since Ethernet switch 204 uses a switch stack protocol that allows the load-balancing control engine 212 to update its TCAM, the load-balancing decision is not done inline on the Ethernet switch 204, but rather is offloaded to the load balancing logic 213 in the load balancing control engine 212. Thus, Ethernet switch 204 is unaware of how the load-balancing decision is made, including the use and/or existence of any redirection algorithms used to redirect the IP packet flow 202.

Figure 3:
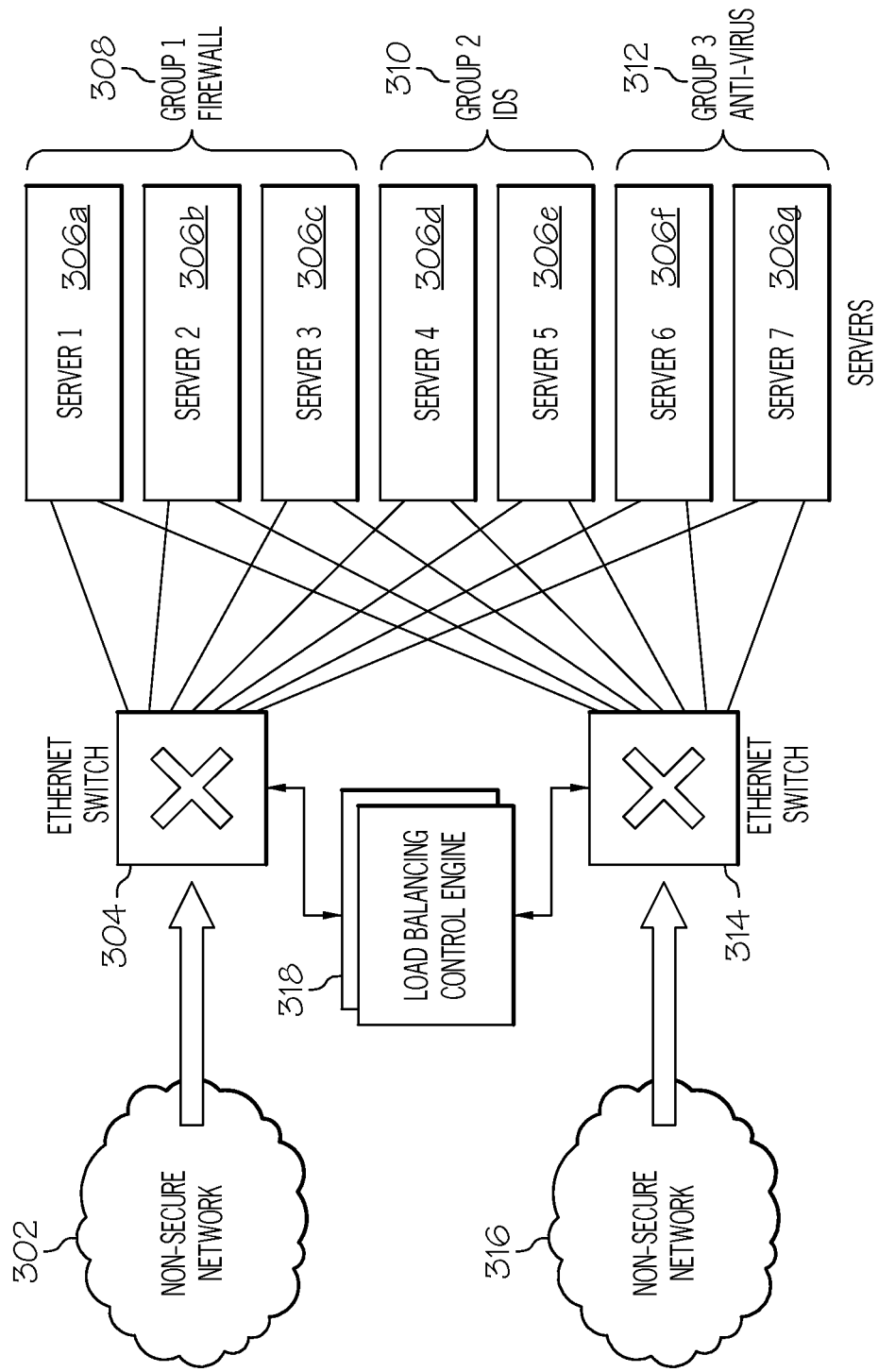
FIG. 3 depicts an exemplary relationship among an Ethernet switch, a load balancing control engine, and multiple servers in accordance with one embodiment of the present disclosure.

With reference now to FIG. 3, additional detail of another process/system similar to that shown in FIG. 2 is presented. A non-secure network 302 sends an IP packet flow to an Ethernet switch 304, which is analogous to Ethernet switch 204 shown in FIG. 2. The IP packet flow is directed to one or more of the servers in a set of servers 306a-h (which are analogous to servers 208a-n shown in FIG. 2). Servers 306a-h are separated into three groups: group 1 (308), group 2 (310), and group 3 (312). In one embodiment, the applications on the servers are deployed in sequence, such that IP packet flow traffic is guided through a Firewall (Group 1—308) and then an Intrusion Detection System (Group 2—310) and then through an Anti-Virus Application (Group 3—312). Therefore, in addition to load-balancing the traffic across the servers within a group, the Ethernet switch 304 has to guide the traffic through a specific sequence of applications. For example, the IP packet flow traffic may need to go through Group 1, Group 2 and then Group 3 or it may only need to go through Group 1 and Group 2, etc. The IP packet flow traffic is then directed via an internal Ethernet switch 314 to a secure network 316, either with or without using the load balancing control engine 318 (analogous to load balancing control engine 210 shown in FIG. 2), depending on whether the servers 306a-h are balanced or not.

In one embodiment, Ethernet switch 304 has the following capabilities/features:
1. Logic that supports rules that steer traffic to a service (group of servers, i.e. group of ports) or to a specific server (port).
2. A service that is composed of multiple servers (defined within the switch as a group such as a Link Aggregation Group (LAG), i.e., group of ports).
3. Logic that supports some sort of traffic load-distribution (e.g. hash/CRC/modulus) to select a specific server port within a defined service LAG to which the packet is to be sent.
4. Logic to support a settable flag 'busy' on a per port basis.
5. Logic to support the recognition of TCP SYN packets destined to a 'busy' port which it redirects to another port.
6. A switch protocol (e.g., Stack/Stacked Switch Protocol) between the switch modules within a switching system, which may also be extended to a service/server. For the purpose of this disclosure this protocol will be referred to as a Stack Switch Protocol. The protocol capabilities preferably include:
  a. A capability to perform switch (switch system) modification either directly to a switch module or by communication with a switch system control point. Modifications supported to include setting/resetting TCAM rules and setting 'busy' flag per port.
  b. A capability to send a packet to the switching system directed to a specific switch egress port (to a server).
  c. A capability to send a packet between switching system and a server with ancillary information to include the target switch egress port for the packet and optionally other information such as the last switch ingress port (e.g., in the rule) of the packet.
7. A Redirection Table which redirects packets based on the 5-tuple and (generally) on switch ingress ports. Entries in the Redirection Table may be created (and deleted) over the Stack Switch Protocol. NOTE: the Redirection Table may be implemented in the switch rules TCAM, where these redirection rules are put in the higher order of precedence part of the TCAM.

Figure 4:
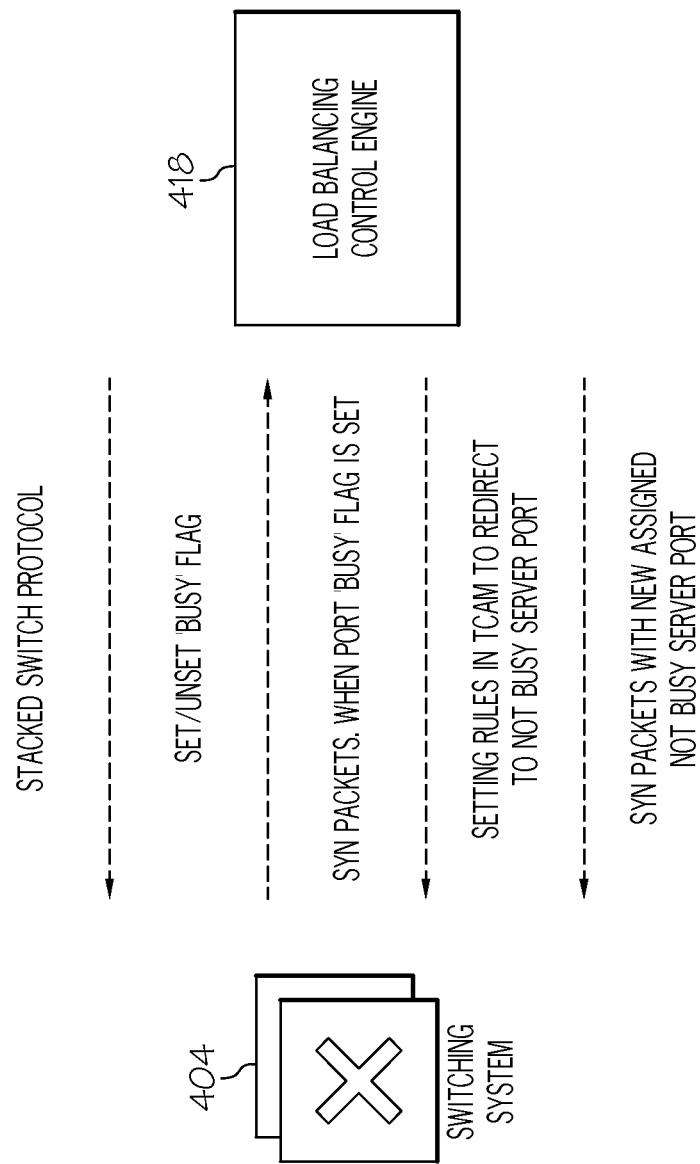
FIG. 4 illustrates exemplary signaling between the Ethernet switch and the load balancing control engine depicted in FIGS. 2-3.

With reference now to FIG. 4, an exemplary load balancing control engine 418 (analogous to load balancing control engine 318 and load balancing control engine 212 shown in FIGS. 3 and 2 above) is coupled to a switching system 404 (analogous to Ethernet switch 204 and Ethernet switch 304 shown in FIGS. 2 and 3 above) using Stack Switch Protocol. This link allows:
1. load balancing control engine 418 to set/unset the flag of a switch port as 'busy' (servers are monitored by the load balancing control engine 418);
2. switching system 404 to send a TCP packet with a set SYN flag to the load balancing control engine 418 when the packet is directed to a port with the 'busy' flag set;
3. load balancing control engine 418 to set a rule in the switch system TCAM to redirect packets of a flow to an assigned alternate server (within a service group); and
4. load balancing control engine 418 to route a TCP SYN packet to the switching system 404 with steering to a newly assigned "not busy" server port.

Figure 5:
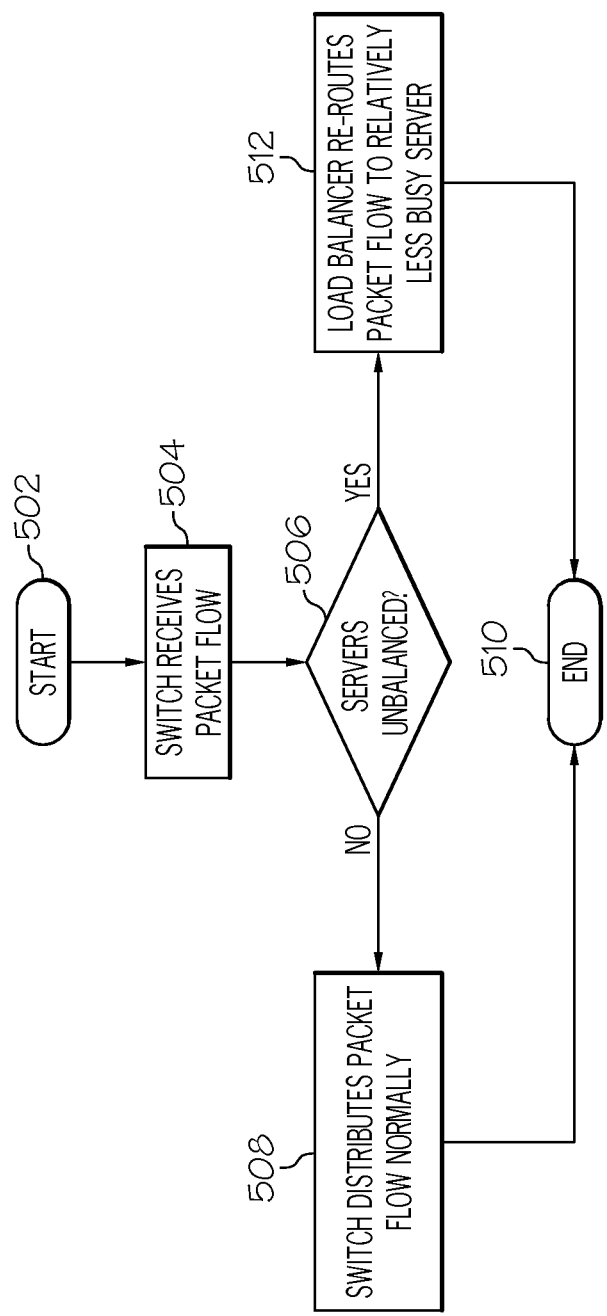
FIG. 5 is a high level flow chart of exemplary steps taken to load balance IP packet flows.

With reference now to FIG. 5, a high level flow chart of exemplary steps taken to load balance IP packet flows is presented. Initiator block 502 may be in response to the coupling of an Ethernet switch to a load balancing control engine. In one embodiment, the IP packet flow redirection logic within the load balancing control engine is hidden from the Ethernet switch, such that the Ethernet switch is not burdened with determining if and how load balancing is to be performed. The term "hidden" means that the Ethernet switch is unable to directly access, or even be logically aware of, the IP packet flow redirection logic. Thus, the Ethernet switch and the TCAM described herein remain small and manageable. As depicted in block 504, the Ethernet switch, which routes IP packet flows to servers and/or other processing/routing devices, receives an IP packet flow. The load balancing control engine determines if the servers are balanced in their workloads. If the servers are balanced (query block 506), then the switch routes the IP packet flow to the servers based on its TCAM rules and load-distribution function (block 508), and the process ends (terminator block 510). However, if the load balancing control engine determines that the servers are unbalanced (query block 506), then the IP packet flow load-balancing logic within the load balancing control engine instructs the switch to redirect the IP packet flow to a server that is relatively less busy than the server to which the IP packet flow was originally addressed (block 512).

As described herein, in one embodiment, a record of where the IP packet flow is directed is stored only for IP packet flows that are redirected in response to the servers being unbalanced in their workloads. In one embodiment, rules for directing and redirecting IP packet flows are stored in a memory in the switch, which may be an Ethernet switch. As described in FIG. 3 above, the servers may be made up of multiple server groups, in which case the method can also include the step of redirecting the IP packet flow to a specific sequence of servers, wherein each server in the specific sequence of servers comes from a different server group from the multiple server groups. As described in one embodiment in FIG. 3, the multiple server groups comprise a firewall server group, an intrusion detection system (IDS) server group, and an anti-virus application server group, and wherein the IP packet flow is redirected to sequentially pass through a selected server from each of the firewall server group, the IDS server group, and the anti-virus application server group.

Figure 6A:
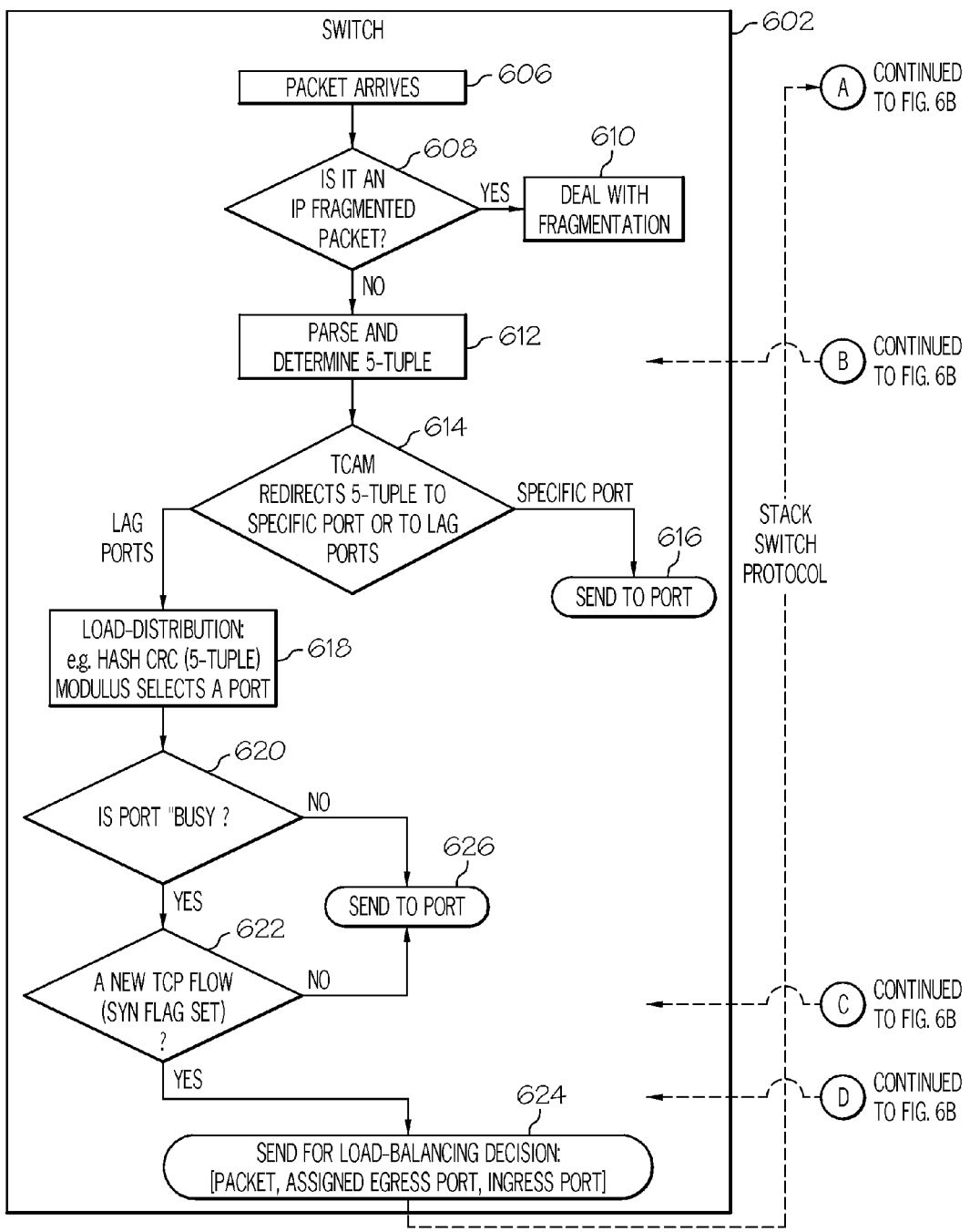
FIG. 6 is a flow chart of steps performed by the Ethernet switch and the load balancing control engine depicted in FIGS. 2-3.
Figure 6B:
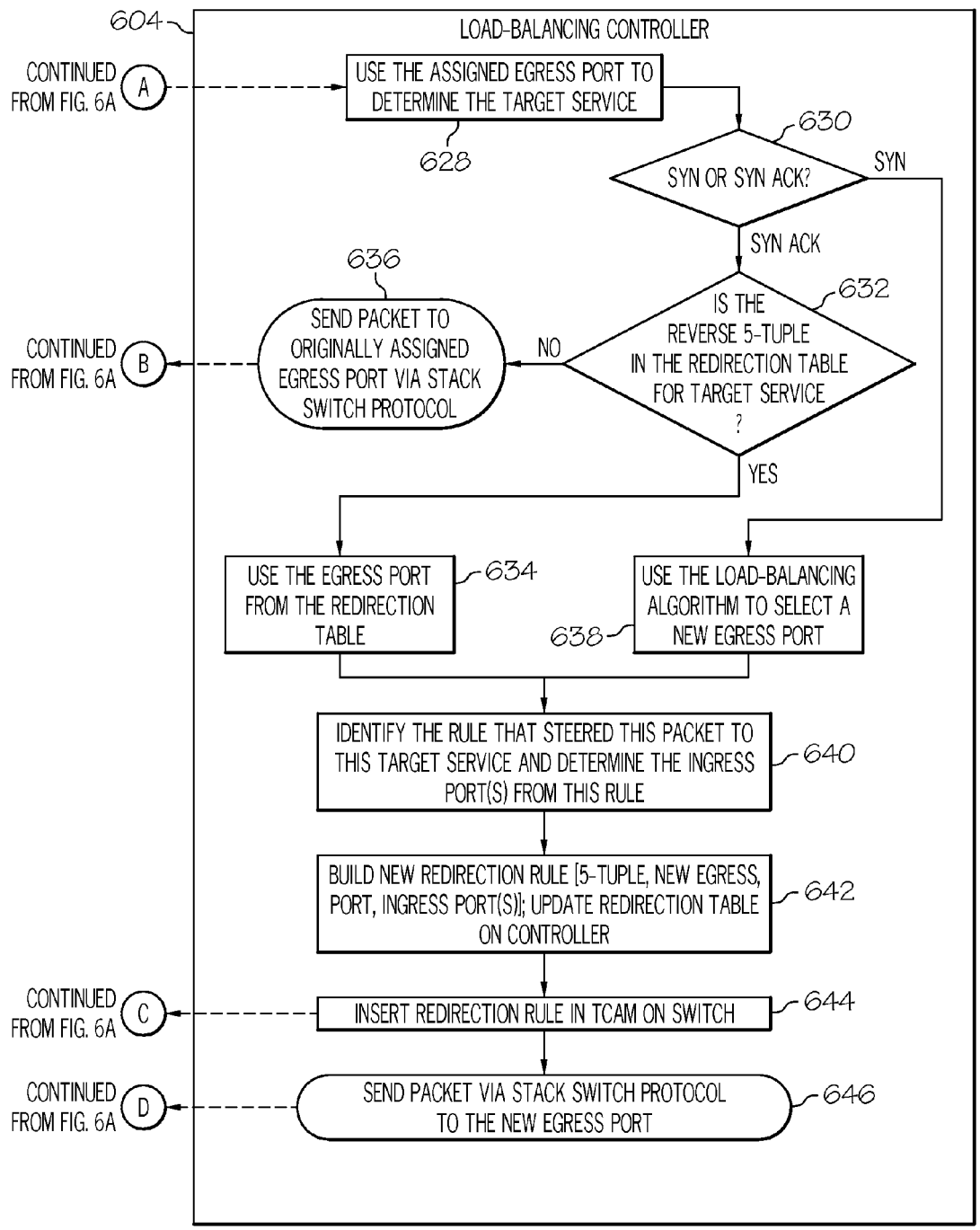

With reference now to FIG. 6, an additional description of exemplary functions performed by a switch 602 (analogous to Ethernet switch 204 and Ethernet switch 304 shown in FIGS. 2 and 3 above) and a load-balancing controller 604 (analogous to load balancing control engine 212 and load balancing control engine 318 shown in FIGS. 2 and 3 above) is presented. As depicted in FIG. 6, switch 602 receives a packet (block 606). A query is optionally made as to whether the packet is an IP fragmented packet (query block 608). That is, in IP ver 4 a packet can be split into numerous fragments by intermediate routers along its path if it happens to pass through a link with a smaller maximum transmission unit (MTU) than the original packet size. If so, then only the header of the first/lead fragment contains the entire 5-tuple on where to route the packet and fragments may arrive out of order, and thus need to be dealt with accordingly (block 610). Otherwise, the 5-tuple of the packet's header is parsed (block 612). If there is an entry in TCAM for a specific egress port for this 5-tuple (query block 614), then the packet is routed to a target switch port (block 616). Alternatively, the switch 602 performs rules steering (or Layer 2/3 of the OSI 7-layer model) to select the service/LAG (Link Aggregation Group) to which the packet is to be directed. The rules match on ingress ports and various header elements. In one embodiment, the switch 602 performs a traffic load-distribution function by hashing various header elements, optionally applying CRC to the result of header hash, and applying a modulus to the resulting value to select a specific port (block 618). If the egress port selected has the 'busy' flag set (query block 620) and the packet is a TCP SYN (or SYN ACK), as queried in query block 622, then the packet is redirected (block 624) to the switch port attached to the Load Balancing Controller 604 over the Stack Switch Protocol. That is, using the Stack Switch Protocol, the switch 602 sends to the Load Balancing Controller 604 the packet, the targeted "busy" egress port identification and potentially the switch ingress port of the packet. Otherwise, if the SYN flag is not set then the packet is sent to the load-distribution resulting port (block 626) regardless of the state of the port. This is done so that ongoing flows cannot be redirected. Redirection is only possible at the beginning of a new TCP flow (i.e. detecting a SYN packet).

To perform its function of redirecting IP packet flows, the Load Balancing Controller 604 uses information about the following switch 602 configuration elements:

Rules Definitions: Load Balancing Controller 604 performs packet classification against the Switch 602 by using Rules Definitions for a packet routed to Switch 602 for load balancing. Packet classification is used to determine the rule which routed the packet to the "busy" server. The Switch 602's Rules Definitions may be compiled in such a way as to optimize their use in Load Balancing Controller 604.

LAG definitions for service groups: The switch 602's LAG definitions of Service Groups are synchronized with the service group definition(s) in Load Balancing Controller 604. Load Balancing Controller 604 has a definition of which servers are in each service group and which switch 602 (system) port is connected to which server. Switch 602's LAG definitions and switch port connectivity to servers may be entered into a service group definition table in such a way as to optimize their use in the Load Balancing Controller 604.

As shown in the flow logic of FIG. 6, the Load Balancing Controller 604 receives a TCP SYN/SYN ACK packet from Switch 602 over the Stack Switch Protocol, and from the packet Assigned Egress Port (via the Stack Switch Protocol) determines the Target Service (block 628). If the received packet is SYN ACK (query block 630) and there is a reverse flow already established in the Redirection Table for this Target Service (query block 632), then the alternate server identified in the Redirection Table is used, and the server port from the target LAG definition is identified. Note that the redirection table in the Load Balancing Controller 604 contains all the 5-tuple redirections rules. Each rule must have the following three fields [5-tuple, Egress Port, Ingress Port(s)]. The reverse flow check applies only to non-connection terminating service as it is identifying the reverse flow through the service.

If the received packet is SYN ACK (query block 630) but there is not a reverse flow in the Redirection Table (query block 632), then the packet is sent to Switch 602 over the Stack Switch Protocol with the packet directed to the original assigned egress port (block 636).

If the packet is a SYN (query block 630), then a load balancing algorithm is used to determine an alternate server and egress port within the Target LAG (service) to direct the packet flow (block 638). Note that the load balancing algorithm used to select the alternate server within the service can be whatever is appropriate, and could vary by service (within the same system).

Using the information about the ingress port of the packet, a determination is made of which rule in Switch 602's TCAM caused the packet to be steered to the assigned egress port (block 640). As described in block 642, a Redirect rule is built based on the ingress ports from the rule identified above, the matching exact 5-tuple of the packet and the new egress port for the selected alternate server. As described in block 644, the new Redirect Rule is inserted into in Switch 602's system TCAM, optionally based on a higher order of precedence. The packet is then directed to the newly selected switch egress port within Switch 602 via the Stack Switch Protocol (block 646).

In another embodiment, a simpler schema can be used if there is only one service (i.e., the application does not need to be sequenced). In this embodiment, the Redirect rule can be directly generated from the received packet by use of the packet 5-tuple with all switch ingress ports targeted to the port to the selected server.

An asynchronous process in the Load Balancing Controller manages the setting and resetting of the 'busy' flags on switch ports in the switch system using the Stack Switch Protocol. The load balancing is accomplished by monitoring some set of performance metrics related to the servers within a service to trigger the setting of "busy" flag based on a threshold of one or more of these metrics. Additionally, the use of multiple thresholds can be used to optimize performance across the service as the load increases by appropriate manipulation of the "busy" flags. For example, as all servers reached a first performance threshold level, all "busy" flags would be reset and then only set again when a server reached a next performance threshold level. However, the use of multiple threshold levels requires a greater number of redirection rules, and thus more space within the switch rule space (TCAM).

Note that the present disclosure has been described using SYN packets to identify the beginning of a new TCP connection. Therefore, a mechanism to deal with SYN attacks (i.e., identification of excessive packets each having a SYN component) must be utilized.

Unused 5-tuple redirection rules are deleted from the Redirection Table on the Load Balancing Controller and the switch TCAM when no longer needed, i.e. when an IP packet flow has been completely received and redirected, etc. Switch statistics can be used to determine the lack of use of a redirection rule over a period of time.

As described herein, the present disclosure allows a switching system to provide true, fine-grained load-balancing capability at high data rates while keeping a reasonable TCAM size, and still directing traffic through a sequence of application groups. The present disclosure allows a majority of traffic to be load distributed via switch hardware using static rules, while the Load Balancing Controller service is used on an exception basis to cause the switch to use special rules to redirect specific new flows to less busy servers.

Thus, described herein is a method that uses the traffic load-distribution function (e.g., a hash/CRC/modulus) provided on a switch in combination with dynamic, true load-balancing. The load-balancing is achieved via the redirection of new TCP flows when load skew occurs across the servers due to the load-distribution function of the switch. A Load Balancing Control Engine performs load-balancing by causing the switch to divert new TCP flows targeted to a busy server by the static switch load-distribution function to another less busy server. A busy server is one that does not meet a certain performance metric. For selected load-balanced flows, the switch is set to route packets directly to server ports, thus bypassing the switch load-distribution function. The Load Balancing Control Engine monitors the servers and, when a server exceeds a performance threshold, sets rules in the switch's TCAM to redirect selected flows (header 5-tuple) to an alternate, less busy server. This is done without impacting the sequence of services to which the packet would have been directed by other rules in the switch. Thus, the switch load-distribution function directs most of the data plane traffic. Only when a server becomes busy does the true load-balancing per-flow redirection occur via specific 5-tuple rules in TCAM. This provides for fine-grain, true load-balancing while keeping the size of the TCAM reasonable. The Load Balancing Control Engine deals with control plane traffic and only TCP SYN packets destined to busy servers.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A method of routing IP packet flows, the method comprising:
   receiving, by an Ethernet switch that is coupled to a load balancing control engine, an IP packet flow, wherein the IP packet flow is a series of packets, wherein each of the packets in the IP packet flow has a header that contains a same 5-tuple, wherein the same 5-tuple comprises a source internet protocol (IP) address, a source port number, a destination IP address, a destination port number, and a protocol number that describes what protocol is being used to direct and control each packet in the IP packet flow, and wherein the Ethernet switch routes packets of the IP packet flow to servers from multiple server groups, wherein the multiple server groups comprise a firewall server group, an intrusion detection system (IDS) server group, and an anti-virus application server group, and wherein the IP packet flow is redirected to sequentially pass through the firewall server group, followed by the IDS server group, followed by the anti-virus application server group;
   determining, by the load balancing control engine, whether the servers are balanced in their utilization according to 5-tuple redirection rules contained in the load balancing control engine; and
   in response to the load balancing control engine determining that the servers are unbalanced, the load balancing control engine instructing the Ethernet switch to redirect the IP packet flow to a server that is relatively less busy than other servers.

2. The method of claim 1, further comprising:
   in response to the load balancing control engine determining, according to the 5-tuple redirection rules, that the servers are balanced, routing, by the Ethernet switch, the IP packet flow to the servers.

3. The method of claim 1, wherein a record of where the IP packet flow is directed is stored in a memory in the Ethernet switch only for IP packet flows that are redirected in response to the servers being unbalanced in their workloads.

4. The method of claim 1, wherein rules for directing and redirecting IP packet flows are stored in a memory in the Ethernet switch.

5. The method of claim 1, further comprising:
   redirecting the IP packet flow to a specific sequence of servers, wherein each server in the specific sequence of servers comes from a different server group from the multiple server groups.

6. The method of claim 1, further comprising:
configuring load balancing logic within the load balancing control engine to be hidden from the Ethernet switch.

7. The method of claim 1, wherein the IP packet flow is routed to the servers without the Ethernet switch directly receiving any feedback from the servers regarding utilization of the servers.

8. An Ethernet switch coupled to a load balancing control engine, wherein a load balancing logic within the load balancing control engine is logically isolated from the Ethernet switch, the Ethernet switch comprising:
a port for receiving an Internet Protocol (IP) packet flow, wherein the IP packet flow is a series of packets, wherein each of the packets in the IP packet flow has a header that contains a same 5-tuple, wherein the same 5-tuple comprises a source internet protocol (IP) address, a source port number, a destination IP address, a destination port number, and a protocol number that describes what protocol is being used to direct and control each packet in the IP packet flow, and wherein the Ethernet switch routes packets of the IP packet flow to servers from multiple server groups, wherein the multiple server groups comprise a firewall server group, an intrusion detection system (IDS) server group, and an anti-virus application server group, and wherein the IP packet flow is redirected to sequentially pass through the firewall server group, followed by the IDS server group, followed by the anti-virus application server group;
a memory for storing instructions for determining whether the servers are balanced in their utilization according to 5-tuple redirection rules; and
IP packet flow directing logic for, in response to the load balancing control engine determining, according to the 5-tuple redirection rules, that the servers are balanced, routing, by the Ethernet switch, the IP packet flow to the servers; and in response to the load balancing control engine determining that the servers are unbalanced, the load balancing control engine instructing the Ethernet switch to redirect the IP packet flow to a server that is relatively less busy than other servers.

9. The Ethernet switch of claim 8, wherein rules for directing and redirecting IP packet flows are stored in the memory in the Ethernet switch.

10. The Ethernet switch of claim 8, wherein the servers comprise multiple server groups, the IP packet flow directing logic further comprising:
redirecting logic for redirecting the IP packet flow to a specific sequence of servers, wherein each server in the specific sequence of servers comes from a different server group from the multiple server groups.

11. The Ethernet switch of claim 8, wherein the IP packet flow is routed to the servers without the Ethernet switch directly receiving any feedback from the servers regarding utilization of the servers.

12. A computer program product for routing Internet Protocol (IP) packet flows, the computer program product comprising:
a non-transitory computer readable storage media;
first program instructions to receive, by an Ethernet switch that is coupled to a load balancing control engine, an IP packet flow, wherein the IP packet flow is a series of packets, wherein each of the packets in the IP packet flow has a header that contains a same 5-tuple, wherein the same 5-tuple comprises a source internet protocol (IP) address, a source port number, a destination IP address, a destination port number, and a protocol number that describes what protocol is being used to direct and control each packet in the IP packet flow, and wherein the Ethernet switch routes packets of the IP packet flow to servers from multiple server groups, wherein the multiple server groups comprise a firewall server group, an intrusion detection system (IDS) server group, and an anti-virus application server group;
second program instructions to determine, by the load balancing control engine, whether the servers are balanced in their utilization according to 5-tuple redirection rules contained in the load balancing control engine;
third program instructions to, in response to the load balancing control engine determining, according to the 5-tuple redirection rules, that the servers are balanced, route, by the Ethernet switch, the IP packet flow to the servers;
fourth program instructions to, in response to the load balancing control engine determining that the servers are unbalanced, instruct the Ethernet switch to redirect the IP packet flow to a server that is relatively less busy than other servers; and
fifth program instructions to sequentially redirect the IP packet flow through the firewall server group, followed by the IDS server group, followed by the anti-virus application server group; and wherein
the first, second, third, fourth, and fifth program instructions are stored on the non-transitory computer readable storage media.

13. The computer program product of claim 12, further comprising:
sixth program instructions to store, in a memory in the Ethernet switch, a record of where the IP packet flow is directed, wherein the record of where the IP packet flow is directed is stored only for IP packet flows that are redirected in response to the servers being unbalanced in their workloads; and wherein
the sixth program instructions are stored on the non-transitory computer readable storage media.

14. The computer program product of claim 12, wherein rules for directing and redirecting IP packet flows are stored in a memory in the Ethernet switch.

15. The computer program product of claim 12, further comprising:
sixth program instructions to redirect the IP packet flow to a specific sequence of servers, wherein each server in the specific sequence of servers comes from a different server group from the multiple server groups; and wherein
the sixth program instructions are stored on the non-transitory computer readable storage media.

16. The computer program product of claim 12, further comprising:
sixth program instructions to configure load balancing logic within the load balancing control engine to be hidden from the Ethernet switch; and wherein
the sixth program instructions are stored on the non-transitory computer readable storage media.

17. The computer program product of claim 12, wherein the IP packet flow is routed to the servers without the Ethernet switch directly receiving any feedback from the servers regarding utilization of the servers.

* * * * *